United States Patent [19]

Lawhon

[11] 4,420,425
[45] Dec. 13, 1983

[54] METHOD FOR PROCESSING PROTEIN FROM NONBINDING OILSEED BY ULTRAFILTRATION AND SOLUBILIZATION

[75] Inventor: James T. Lawhon, College Station, Tex.

[73] Assignee: The Texas A&M University System, College Station, Tex.

[21] Appl. No.: 404,125

[22] Filed: Aug. 2, 1982

[51] Int. Cl.$^3$ ............................................. A23J 1/14
[52] U.S. Cl. ................................. 260/123.5; 426/656
[58] Field of Search ...................... 260/112 R, 123.5

[56] References Cited

U.S. PATENT DOCUMENTS

| | | | |
|---|---|---|---|
| 2,881,076 | 4/1959 | Sair | 99/14 |
| 3,142,571 | 7/1964 | McAnelly | 99/14 |
| 3,662,556 | 11/1971 | O'Connor | 260/123.5 |
| 3,728,327 | 4/1973 | Frazeur et al. | 260/123.5 |
| 3,736,147 | 5/1973 | Iacobucci et al. | 99/17 |
| 3,993,636 | 11/1976 | Maubois et al. | 260/123.5 |
| 3,995,071 | 11/1976 | Goodnight et al. | 426/598 |
| 4,072,670 | 2/1978 | Goodnight et al. | 260/123.5 |
| 4,088,795 | 5/1978 | Goodnight et al. | 426/598 |
| 4,091,120 | 5/1978 | Goodnight et a. | 426/598 |
| 4,332,719 | 6/1982 | Lawhon et al. | 260/123.5 X |

OTHER PUBLICATIONS

Lawhon, et al. "Production of Protein Concentrates from Oilseed Flour Extracts Using Industrial Ultrafiltration and Reverse Osmosis Systems" 42 *Journal of Food Science* 389 (1977).

Lawhon, et al. "Optimazation of Protein Isolate Production from Soy Flour Using Industrial Membrane Systems" 43 *Journal of Food Science* 361 (1978).

Jujimaki et al. Studies on Flavor Components in Soybean, Part I. Aliphatic Carbonyl Compounds, 29 Agr. Biol. Chem. 855–863 (1965).

Arai, S. et al., Studies on Flavor Components in Soy Bean, Part II,. Phenolic Acids in Defatted Soy Bean Flour, 30 Agr. Biol. Chem. 365–369 (1966).

Arai, S. et al., Studies on Flavor Components in Soy Bean, Part III, Volatile Fatty Acids and Bolatile Aminos, 30 Agr. Biol. Chem. 863 (1966).

Arai et al, Studies on Flavor Components in Soybean, Part IV, Volatile Neutral Compounds, 31 Agr. Biol. Chem. 868–873 (1967).

Arai, et al., n-Hexanal and Some Volatile Alcohols, Their Distribution in Raw Soybean Tissues, 34 Agr. Biol. Chem, 1420–23 (1970).

Hsich et al., Isolation in and Identification of Objectionable Volatile Flavor Compound in Defatted Soybean Flour, 47 Journal of Food Science 16 (1981).

Huuang et al., Characterization of the Nonvolatile Minor Constituents Responsible for the Objectionable Taste of Defatted Soybean Flour, 47 Journal of Food Science 19 (1981).

J. S. L. How and C. V. Morr, "Removal of Phenolic Compounds from Soy Protein Extracts Using Activated Carbon, V. 47 (1982).

Wolf et al., "Soybeans as a Food Source", 99 *Arch. Biochem Biophys.* 265 (1962).

Mustakas, G. C. et al., "Flash Desolventizing Defatted Soybean Meals Washed with Aqueous Alcohol to Yield High-Protein Product" 39 J. Am. Oil Chem. Soc. 222 (1962).

Lawhon, et al., "Alternate Processes for Use in Soy Protein Isolation by Industrial Ultrafiltration Membranes", 44 *Journal of Food Sciences* 213 (1979).

*Primary Examiner*—Howard E. Schain
*Attorney, Agent, or Firm*—Arnold, White & Durkee

[57] ABSTRACT

There is provided a method of producing proteins from nonbinding oilseeds such as soybeans and peanuts by solubilization and ultrafiltration. A filterable protein feed is produced by extraction from a mixture of water and nonbinding oilseeds such as soybeans or peanuts. The feed is then passed over an ultrafiltration membrane system with a molecular weight cutoff of about 70,000 and preferably of 100,000 daltons or more. While the feed is being passed over the ultrafiltration membrane, the concentration or dilution of the protein feed is properly controlled in order to insure separation into the permeate of a substantial portion of that fraction of the constituents which produce color and flavor in the ultimate product.

46 Claims, 4 Drawing Figures

METHOD FOR PROCESSING PROTEIN FROM NONBINDING OILSEED BY ULTRAFILTRATION AND SOLUBILIZATION

BACKGROUND OF THE INVENTION

This invention relates generally to a method and apparatus for producing proteins from oilseeds and more particularly to a method of producing soy proteins by solubilization and ultrafiltration.

Soy protein products are valued not only as a source of protein, but also as food additives for enhancing texture and other functional characteristics of various products. However, the use of soy protein products is limited due to their beany flavor and tan-like color.

Soy protein has been shown to consist of at least four major fractions. The approximate amounts and molecular weights of each of these fractions, as determined by ultracentrifugation, are set forth in Table 1. The various fractions are identified by sedimentation coefficients. The data in Table 1 was taken from Wolf et al. 99 "Arch. Biochem. Biophys." 265 (1962).

TABLE 1

| Fraction | Percent of Total | Component | Molecular Weight |
|----------|------------------|-----------|------------------|
| 2S | 22 | Trypsin inhibitors | 3,000–21,500 |
|  |  | Cytochrome c | 12,000 |
| 7S | 37 | Hemagglutinins | 110,000 |
|  |  | Lipoxygenases | 102,000 |
|  |  | B-Amylase | 61,700 |
|  |  | 7S Globulin | 180,000–210,000 |
| 11S | 31 | 11S Globulin | 350,000 |
| 15S | 11 | — | 600,000 |

Researchers have been unable to pinpoint exactly what soybean constituents are responsible for flavor and color, though many compounds are suspected of causing these characteristics. How et al. "Removal of Phenolic Compounds from Soy Protein Extracts Using Activated Carbon," 47 Journal of Food Science 933 (1982) list several organic compounds that are said to produce off-flavors in soy proteins. Among these are aliphatic carbonyls, phenolics, volatile fatty acids and amines, esters and alcohols. Most processes for improving soy protein flavor involve the application of heat, toasting, alcohol extraction or enzyme modification. However these processes normally result in substantial protein denaturation and modification, which alter the product's functionality. In addition, they also promote interaction with lipid and carbohydrate constituents and their decomposition products. Such reactions tend to reduce the utility of soy proteins in most food products, especially in those that require highly soluble and functional proteins, as in dairy foods and beverages.

How et al. used activated carbon to improve flavor and color. However, the activated carbon did not remove the bitter and astringent flavor descriptions and otherwise failed to improve the color above that of commercial soy protein isolates.

Many processes have been described or developed to more efficiently produce soy protein products. Commercial soy isolation processes generally use acid precipitation without resort to ultrafiltration. A typical method of producing soy protein isolates, which are defined as products having at least 90% by weight protein, may include the steps of: (1) extracting the protein from soy flakes with water at an alkaline pH; (2) centrifuging out any solids from the liquid extract; (3) subjecting the liquid extract to isoelectric precipitation by adjusting the pH of the liquid extract to the point of minimum protein solubility to obtain the maximum amount of protein precipitate; (4) centrifuging to separate precipitated protein curd from by-product liquid whey; (5) adjusting the pH of the precipitated protein to slightly below neutral pH; and (6) spray drying the protein to obtain the final product. This process, however, still produces a protein product with a distinctive taste and color.

Commercial soy protein concentrates, which are defined as soy protein products having at least 70% by weight protein, are generally produced by removing soluble sugars, ash and some minor constituents. Sugars are removed by extracting with: (1) aqueous alcohol; (2) dilute aqueous acid; or (3) water, after first insolubilizing the protein with moist heating. McAnelly, U.S. Pat. No. 3,142,571; Sair, U.S. Pat. No. 2,881,076; and Mustakas, G. C. et al. "Flash Desolventizing Defatted Soybean Meals Washed with Aqueous Alcohol to Yield a High-Protein Product," 39 J. Am. Oil Chem. Soc. 222 (1962) are illustrative in this regard. These processes also produce soy protein products with a distinctive taste and color.

Other methods have been developed for producing soy proteins, which employ different types of protein extraction. For example, Frazeur, U.S. Pat. No. 3,728,327 relates to a method for obtaining soy protein relying on homogenization to obtain a fine dispersion which is subjected to some centrifugal separation. The liquid extract obtained from the centrifugal separation is then subjected to reverse osmosis. The retentate from the reverse osmosis is dried to produce the final product.

A number of processes make some use of ultrafiltration in producing soy or other protein products. For example, Goodnight, U.S. Pat. No. 3,995,071 relates to a process for preparing a soy protein having a greatly reduced phytic acid content by the steps of aqueous extraction of defatted soy flakes, basification to a pH in excess of 10.1 and the removal of insolubles. More particularly, the process is carried out by the steps of: (1) extracting a soy protein in an alkaline solution and removing the sediment by centrifugation; (2) adding a base to the extract to raise the pH to a level of 10.1 or greater; (3) separating the resultant solids by centrifugation; (4) neutralizing the extract; and (5) subjecting the extract to ultrafiltration to retain the protein while allowing the lower molecular weight compounds to pass. A semipermeable membrane capable of retaining protein, having a minimum molecular weight in the range of about 10,000–50,000 daltons may be used. Retentate is preferably maintained at a temperature of about 45° C. during the ultrafiltration process and a diafiltration or washing operation may be used on the retentate to eliminate any remaining low molecular weight constituents.

Iacobucci, U.S. Pat. No. 3,736,147 discloses a process for preparing soy and other protein products having a low phytic acid content. Ultrafiltration is preferably carried out in a membrane having a molecular weight cutoff of 10,000–30,000 daltons with the lower limit preferred.

Other exemplary processes are described in U.S. Pat. Nos. 4,088,795; 4,091,120 and 4,072,670, all of which are by Goodnight et al. U.S. Pat. No. 4,072,670 is directed to a method for preparation of a purified soy protein having a lower phytic acid content, while U.S. Pat. No.

4,091,120, employs an ultrafiltration membrane to separate a portion of soybean carbohydrates and mineral constituents to produce a soy protein solution from an extracted aqueous solution of soy protein.

U.S. Pat. No. 4,088,795 is directed to a membrane filtration process for eliminating soluble carbohydrates from an aqueous oilseed lipid-containing suspension. Soybean is preferred as the oilseed. The ultrafiltration membrane has a molecular weight cutoff of about 10,000 to 50,000. The solubilized protein feed is concentrated by the ultrafiltration of the feed to give a volume of permeate equal to one-half the volume of the feed. Removal of additional carbohydrates and mineral constituents is then accomplished by continuously adding a diafiltration solution such as water to the retentate as it circulates through the filtration system in order to wash out the carbohydrates and mineral constituents.

Other processes have been developed using some form of ultrafiltration membranes to produce protein products from other than soybean. For example, O'-Conner, U.S. Pat. No. 3,622,556 discloses a method for isolating protein from sunflower meal. Pursuant to one embodiment of the disclosure, the sunflower meal is first subjected to a conventional alkali extraction step under an inert gas blanket. The extract, which contains water, protein, green color forming precursors and other constituents, is then subjected to ultrafiltration under an inert gas blanket. In an alternate method the retentate is next subjected to further ultrafiltration. The inert gas blanket is required to prevent formation of the color causing compound. The ultrafiltration membrane should have a pore size sufficient to allow molecules having a molecular weight of 100,000 to 10,000 and less to pass through while not permitting passage of higher molecular weight molecules such as proteins.

Maubois, U.S. Pat. No. 3,993,636 relates to a process for obtaining protein isolates from sunflower and colza without resorting to an inert atmosphere. Pursuant to that process, ground seeds are first dissolved in an alkaline solution. The solution is then ultrafiltered at a temperature of 2°–30° C. to obtain a retentate having an amount of nitrogenous matter in the range of 3–12% by weight. The retentate is then treated by several more steps, including: continuing ultrafiltration at the same temperature but with a volume of wash liquid, adjusting the temperature of the retentate to 20°–60° C. while continuing the ultrafiltration procedure and thereafter recovering concentrated retentate. The membranes used in ultrafiltration have a well defined cutoff in the range of 2,000–30,000.

The inventor of the present inventive apparatus and method has also developed a number of processes for producing protein products. For example, Lawhon et al., Alternate Processes for Use in Soy Protein Isolation by Industrial Ultrafiltration Membranes, 44 Journal of Food Sciences 213 (1979) discusses the use of calcium hydroxide to extract a soy protein followed by ultrafiltration and spray drying of a protein isolate. The molecular weight cut-off of the membranes for ultrafiltration is set in the range of 10,000 to 18,000 with a goal toward obtaining as much protein as possible without sugars and ash.

These and other processes suffer from one or more of several limitations or disadvantages including reduced functional characteristics in the resulting protein product and the production of a product which has both a distinct or "beany" flavor and an off-color such as a dark cream to light tan color.

These and other disadvantages or limitations are substantially minimized, if not eliminated, by the present invention.

SUMMARY OF THE INVENTION

In the disclosed method of processing nonbinding oilseed protein particularly soy protein, at least a portion of the protein contained in the oilseed is solubilized to produce a filterable protein feed stream. Thereafter the feed stream is passed in the form of a solution or slurry through an ultrafiltration membrane system in order to separate out certain flavor causing and color causing compounds. The membrane system has a molecular weight cutoff of about 70,000 and preferably 100,000 daltons or higher. While passing the feed through the membrane system, in accordance with a preferred method, the concentration of the feed is controlled to limit self-filtering in the membrane system. A permeate and a retentate are produced, the retentate having a substantially bland taste and a generally light cream to white color when dried. The permeate may be passed through a reverse osmosis membrane to recover additional byproducts containing a higher content of protein and other valuable constituents. Additionally, the reverse osmosis membrane may be operated such that the permeate of the reverse osmosis membrane is essentially water. The permeate of the reverse osmosis membrane may be recirculated for solubilizing protein in the soybean. Alternately, a portion of the reverse osmosis membrane permeate may be used to control the concentration of the solubilized protein slurry prior to or during its passage through the ultrafiltration membrane system.

In one embodiment the filterable protein feed stream is produced by solubilizing a substantial portion of the protein in an alkaline environment in order to produce a solubilized protein slurry. In another embodiment the feed stream may be produced by solubilizing nonprotein constuents and some portion of the protein in an acidic environment in order to produce a dispersed protein slurry. Alternately, separate portions of the protein containing material may be used to produce a solubilized protein slurry and a dispersed protein slurry, which are then mixed to form the filterable protein feed stream. The ratio of the separate portions may be used to control the percentage of protein in the final product as well as any by-products.

In a more specific aspect of the present invention, a soy protein product may be produced having a substantially bland taste and generally white to light cream color by several steps. First, soy flour or flakes are mixed in water to produce a mixture. The pH, temperature and concentration of the soy flour mixture is properly controlled in order to dissolve soy protein and produce a solubilized protein slurry comprising a protein solution. Insolubilized solids are then separated out from the protein slurry. The protein slurry may then be prefiltered to remove a sufficient amount of suspended matter in preparation for the ultrafiltration of the protein solution. Prefiltering may not be required depending upon the nature of the ultrafiltering system employed and the ultimate product desired. The protein slurry is then passed from a supply zone or region such as a feed tank over at least one ultrafiltration membrane with a molecular weight cutoff of at least about 100,000 daltons to produce a permeate and a retentate. While the protein solution is passed over the ultrafiltration membrane, the original volume of the protein solution in the feed tank is maintained as the solution is being ultrafiltered by adding water to make up for the permeate removed by the ultrafiltration membrane and any retentate not recycled to the feed tank.

The pH of the initial soybean water mixture may be increased by the addition of either sodium or calcium hydroxide. The pH of the mixture is between about 7 and 11 and is preferably around 8, while the ratio of soybean material to water is between 40 to 1 and 10 to 1 and preferably is around 30 to 1 and the temperature of the mixture is between about 40° and 70° C. with around 55° C. being preferred.

In an even more specific aspect of the present invention, a method of isolating soy protein having substantially bland taste and generally white to light cream color comprises the steps of: (a) mixing defatted soy flour in water to produce a mixture wherein the ratio of soy to water by weight is between 40 to 1 and 10 to 1 and the temperature of the mixture is between 55° and 60° C.; (b) achieving a pH of the mixture around 8 in order to dissolve soy protein and produce a solubilized protein slurry comprising a protein solution; (c) separating out the insolubilized solids from the protein slurry; (d) prefiltering the protein slurry to remove a sufficient amount of suspended matter in preparation for the ultrafiltration of the protein solution; (e) passing the protein solution over at least one ultrafiltration membrane with a molecular weight cutoff of at least about 100,000 to produce a permeate and a retentate while maintaining the original volume of the protein solution in a feed tank as the solution is being ultrafiltered by adding water to make up for the permeate removed from the ultrafiltration membrane and any retentate not recycled to the feed tank while recycling at least a portion of the retentate to the feed tank and collecting the permeate; (f) allowing the volume of the protein solution in the feed tank to decrease once a volume of permeate equal to at least about 1.2 times the volume of the protein solution in the feed tank is collected; and (g) thereafter mixing any unrecycled retentate with the protein solution and spray drying the resultant product after pH adjustment, if desired.

In yet another specific embodiment there is provided a method of producing a soy protein concentrate having a substantially bland taste and colorless appearance. This method may comprise the steps of: (a) mixing defatted soy flour in water to produce a mixture wherein the ratio of soy to water by weight is between about 40 to 1 and about 10 to 1 and the temperature of the mixture is between about 50° and about 60° C.; (b) controlling the pH of the mixture to dissolve nonprotein constituents including sugars and salts and a portion of the protein and to produce a dispersed protein slurry comprising undissolved protein; and (c) passing the protein slurry over at least one ultrafiltration membrane with a molecular weight cutoff of at least about 100,000 to produce a permeate and a retentate while substantially maintaining the original volume of the protein slurry in a feed tank as the slurry is being ultrafiltered by adding water to make up for permeate removed from the ultrafiltration membrane and any retentate not recycled to the feed tank while recycling at least a portion of the retentate to the feed tank and collecting the permeate.

It is unnecessary to prefilter the slurry prior to its passage to the ultrafiltration membrane.

In another embodiment of the present invention, a soy protein product may be produced having a substantially bland taste and white to light cream color including the steps of: (1) mixing defatted soy flour or flakes in water to produce a mixture wherein the ratio of soy to water by weight is between 60 to 1 and 10 to 1, and preferably 40 to 1, and the temperature of the mixture is between 40° and 70° C.; (b) setting the pH of the mixture between 4.0 and 7.0 and preferably at 4.5 or 6.7 in order to dissolve nonprotein soy constituents and partially dissolve soy protein to produce a slurry; (c) passing the slurry over at least one ultrafiltration membrane with a molecular weight cutoff of at least 80,000 and preferably 100,000 daltons or higher to produce a permeate and retentate while maintaining the original volume of the slurry in a feed tank as the slurry is being ultrafiltered by adding water to make up for the permeate removed from the ultrafiltration membrane and any retentate not recycled to the feed tank, while recycling at least a portion of the retentate to the feed tank and collecting the permeate; (d) allowing the volume of the slurry in the feed tank to decrease once a volume of permeate equal to at least about 1.2 times the original volume of the slurry in the feed tank is collected; and (e) thereafter spray drying the retentate after pH adjustment, as desired.

Peanuts or other nonbinding oilseeds may also be processed to produce a substantially bland and colorless protein product in much the same fashion as soybean.

A preferred embodiment of the invention will now be described with reference to the foregoing drawings.

DESCRIPTION OF THE PREFERRED EMBODIMENTS

Figure 1:
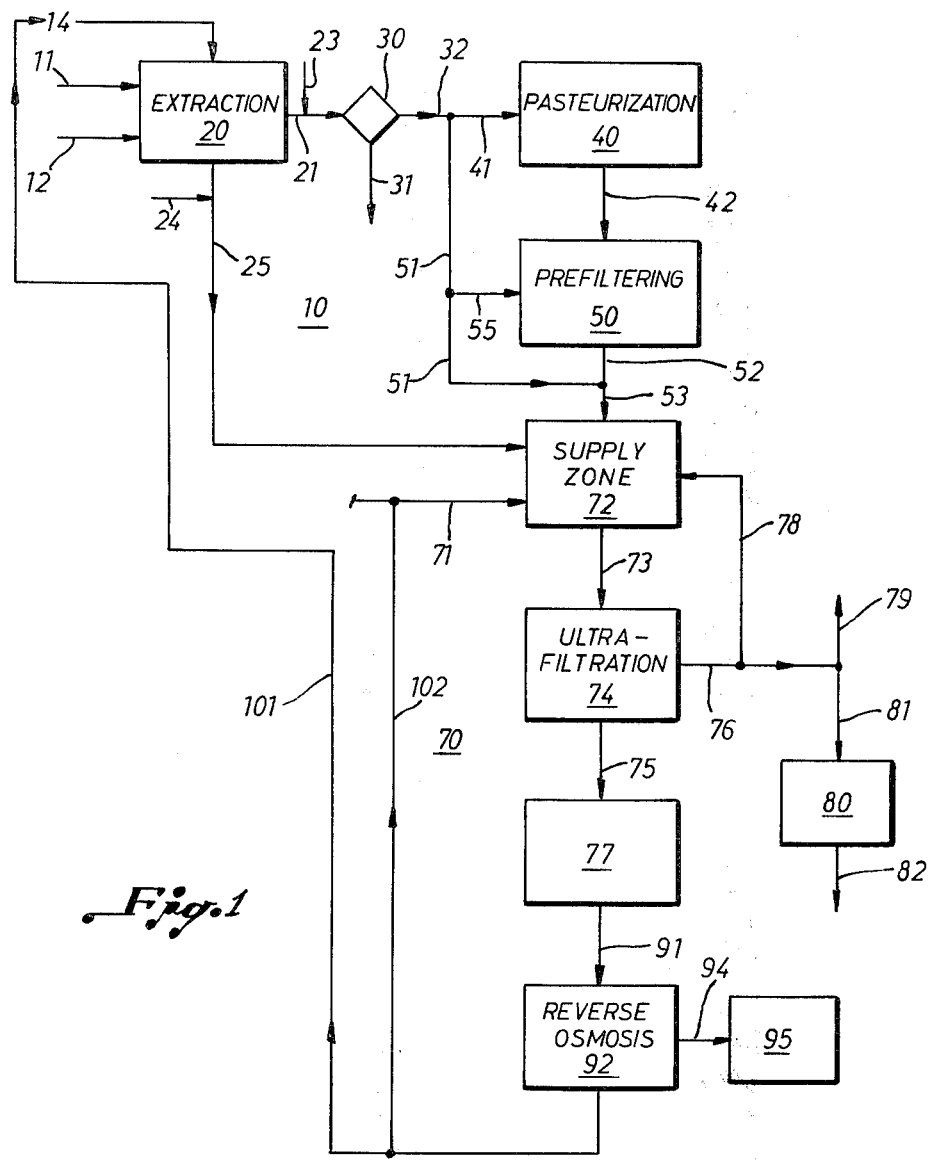
FIG. 1 is a flow diagram of an embodiment of the present invention.

Referring now to FIG. 1, there will now be described a preferred embodiment of a process in accordance with the present invention. Generally, a filterable protein feed stream is produced by solubilizing at least a portion of the protein content of an oilseed, such as soybean, in a mixing zone indicated generally at 10. The mixing zone may act as a dispersion zone to produce a dispersed protein slurry or suspension in which substantial amounts of protein are left undissolved or as a solubilizing zone to produce a solubilized protein slurry or suspension in which salts, sugars and other nonprotein constituents are dissolved along with portions of the protein. In either case the filterable protein feed stream is passed via lines 25 or 53 to an ultrafiltration zone indicated generally at 70 to produce a retentate protein product having a substantially bland flavor and colorless appearance.

In one embodiment substantial amounts of protein are dissolved into solution to produce a solubilized protein slurry by mixing an appropriate solvent, such as water, with a protein material, such as soy flour, at an alkaline pH in mixing zone 10. As substantial amounts of protein are thus dissolved or solubilized, the mixing zone 10 is said to act as a solubilizing zone.

In another embodiment substantially all of the nonprotein constituents are dissolved in solution to produce a dispersed protein slurry by mixing an appropriate solvent, such as water, with a protein material, such as soy flour, at a pH between about 4.5 and 6.7, in mixing zone 10. As substantially all of the sugars, salts and other nonprotein constituents are dissolved, while a substantial portion of the protein remains undissolved or dispersed, the mixing zone 10 is said to act as a dispersion zone.

The protein feed stream is subsequently processed through an ultrafiltration membrane system 74 from a supply region such as that defined by feed or holding tank 72. The molecular weight cutoff of the membrane is at least about 70,000 to 80,000 and is preferably 100,000 or more. The concentration of the feed is controlled to limit self-filtering and produce a permeate which passes via line 75 and a retentate which passes via line 76. This may be done by maintaining the volume of the feed at a constant level by recycling retentate and adding additional solvent such as water to the feed until a volume of permeate equal to at least 1.2 or more, and preferably about 1.3 to 1.5 times the volume of the feed is collected. If a second or concentration phase is employed it is preferable if about 2.0 to 2.5 or 3.0 times the original volume of the feed is finally collected as permeate during both the constant volume and concentration phases. The retentate, which is recovered in either line 79 or 82 is almost colorless when dried and has a substantially bland flavor.

As indicated in FIG. 1, mixing zone 10 may actually comprise a number of stages or steps including an extraction step 20, a centrifuging step 30, a pasteurizing step 40 and prefiltering step 50. Although any of a variety of methods of producing a solubilized protein slurry or feed may be employed in conjunction with the present invention, it is generally preferable to carry out these steps in the order indicated, particularly where an isolate, which is defined as a protein product having a protein concentration of at least 90%, is desired. Alternately, although any of a variety of methods may be employed to produce a dispersed protein slurry, it is generally perferable in such a case to pass the feed stream directly to the ultrafiltration zone 70 after completion of the extraction step 20.

In another embodiment of the present invention there is provided greater flexibility in controlling the protein content of the final product. A mixture of starting protein material and appropriate solvent such as water may be mixed and the pH of a selected portion of the mixture increased to produce a solubilized protein slurry while the pH of the remaining portion is left unchanged or decreased to produce a dispersed protein slurry. The solubilized protein slurry and the dispersed protein slurry may then be mixed after appropriate pH adjustments and the resulting mixture passed as a filterable feed stream to ultrafiltration zone 70. The mixture is then processed through the ultrafiltration zone 70 and a substantially bland and colorless product with a preselected yet variable protein content is produced.

Referring to FIG. 1 there will now be more particularly described a preferred embodiment in which a solubilized protein slurry is processed to produce a protein product, such as a protein isolate.

The starting protein material is preferably a defatted soybean flour or flakes which pass via line 11 to extraction stage or zone 20. The protein material is mixed in zone 20 with appropriate amounts of water passing via line 14, and where a solubilized protein slurry is desired, a suitable base such as sodium hydroxide or calcium hydroxide passing via line 12.

Whole undefatted soybeans contain approximately 40% protein by weight and approximately 20% oil by weight. These whole undefatted soybeans may be defatted through conventional processes when a defatted soybean flour or flakes form the starting protein material. For example, the bean may be cleaned, dehulled, cracked, passed through a series of flaking rolls and then subjected to solvent extraction by use of hexane or other appropriate solvents to extract the oil and produce "spent flakes". After removal of the solvent such as hexane these defatted flakes may then be fed to the extraction zone 20 via line 11. Alternately, the defatted flakes may be ground to produce a flour, which is then fed via line 11 to extraction zone 20. Although it may be preferable to use a defatted soy flour as a protein feed in line 11, since the use of flour may result in a higher yield or percentage recovery, in accordance with the present invention spent flakes may be passed directly to the extraction zone 20 in an unground state.

Although the process is yet to be employed with undefatted soybeans, it is believed that undefatted soy flour may also serve as a protein feed source. However, where undefatted soy flour is processed, it is most likely necessary to use a separation step, such as three stage centrifugation to remove oil and obtain a substantially bland and colorless protein product. Additionally, the source of protein passing via line 11 may be subjected to other processes via its passage to the extraction zone 20. For example, a soy flour may be toasted prior to being passed to the extraction zone 20.

During the extraction stage appropriate amounts of a protein feed such as defatted soy flakes or flour are mixed with appropriate amounts of a base such as sodium hydroxide or calcium hydroxide and water when dissolving the protein into a solution. The ratio of water to protein feed may vary over a wide range depending upon the number of extractions to be performed in extraction zone 20 and the process conditions encountered. For example, if defatted soy flakes are employed the ratio of pounds of water to pounds of soy flakes is preferably 30 to 1 but may vary widely. For example, the ratio of pounds of water to pounds of flakes may be varied between approximately 40 to 1 and 10 to 1. Other ratios might likewise be suitable.

The temperature of the protein feed, base and water mixture generally ranges from about 40° C. to 60° C. and may be as high as 70° C. However, it is preferable not to increase the temperature of the protein feed, base and water mixture above 70° C., since undesirable substances can be produced in the resulting hot alkaline solution. Additionally, the temperature is preferably fixed with regard to the nature of the protein feed entering the extraction zone 20 via line 11. For example, if the protein feed is toasted defatted soy flour the temperature is preferably in the range of 55° to 60° C. However, when untoasted defatted soy flour is used, the temperature is preferably set at about 50° to 55° C. Alternately, if raw ground soy beans or commercial full fat flour is employed, the temperature of the mixture is preferably at about 60° C.

A sufficient amount of a base should be added via line 12 to increase the alkalinity of the water flour mixture to a pH between 7 and 11, but preferably around 8. Although a wide range of pHs may be acceptable depending upon other process conditions, it is believed that a pH of around 8 will result in desireable yields and a bland and white to light cream product. For example, although a sufficient amount of a base such as sodium hydroxide or calcium hydroxide may be added to raise the pH to approximately 9, it is found that the ultimate soy product has more color than would otherwise be the case if the pH were set at a lower value, such as 8.

The type of base may be varied depending upon the nature of the ultimate product. For example, calcium hydroxide rather than sodium hydroxide may be used where a low sodium content product is desired.

Although conditions within the extraction zone 20 may be varied as would be known to one skilled in the art having the benefit of this disclosure, it is preferable when producing protein isolates in accordance with the present invention to dissolve as much of the protein as possible into the liquid state. This in turn will also result in the dissolving of other substances such as sugars, ash, salts and other minor constituents contained in the protein feed passing via line 11.

Prior to ultrafiltration and usually prior to any prefiltering the pH of the protein solution or extract is preferably adjusted with hydrochloric acid or any other suitable acid to reduce the pH to close to 7 in preparation for ultrafiltration processing. For example, as the solubilized slurry produced in zone 20 passes via lines 21 or 25, a suitable amount of a suitable acid such as hydrochloric acid may be added to properly reduce the pH of the protein solution prior to ultrafiltration.

Depending upon the product desired and the equipment employed, the solubilized protein slurry produced in extraction zone 20 may be passed directly to ultrafiltration zone 70 via line 25 or alternately subjected to centrifuging or other suitable separation processes in unit 30 as it passes from extraction zone 20 via line 21. For example, insoluble solids may be separated out of the solubilized protein slurry by means of two phase centrifugation in unit 30. The insoluble residue passing via line 31 may then be used as a process by-product such as an animal feed. The remaining extract absent the insoluble solids and having dissolved proteins as well as sugar, salts and other minor constituents may then pass via line 32.

If undefatted soybean is employed as a feed in line 11, the oil should be separated prior to the passage of the solubilized protein to the ultrafiltration zone or step. For example, if undefatted soybean is used, unit 30 might comprise a three-phase centrifuge producing three streams containing oil, insoluble solids and solubilized protein, respectively.

The solubilized protein feed passing via line 32 may pass directly to ultrafiltration zone 70 or may undergo either one or both of two subsequent steps. Thus, the solubilized protein feed may pass via line 41 to pasteurizing zone 40 where it is subjected to sufficiently high temperatures over a predetermined period of time to kill any bacteria. By way of example, the solubilized feed might be subjected to a temperature of about 65° C. for 30 minutes. Generally, the higher the temperature in pasteurizing the solubilized feed the shorter time required for pasteurization.

The solubilized feed may then pass via line 42 to prefiltering zone 50. Alternately, the solubilized feed may bypass the pasteurizing zone 40 and pass directly from the centrifuging zone 30 to prefiltering zone 50 via lines 51 and 55. This may be particularly appropriate where the solubilized protein will be effectively pasteurized at other stages of the process due to temperature and residence times in those stages.

The solubilized feed is subjected to further filtering in zone 50 in order to take out any suspended matter which may not have been removed during the centrifuging step in zone 30. Depending upon the type of ultrafiltration membranes employed in the ultrafiltration zone 70, as well as the operation of stage 30, a prefiltering step may be necessary to avoid fouling or plugging of the membrane system. By way of example, a prefiltering system with a pore size of 100 microns might be employed with a tubular ultrafiltration membrane, while a prefilter pore size of 50 microns might be required for a hollow fiber ultrafiltration unit such as one produced by Romicon of Woburn, Mass.

After being prefiltered the solubilized protein feed then passes via line 52 and 53 to ultrafiltration zone 70. Alternately, the solubilized feed may pass via lines 51 and 53 directly to the ultrafiltration zone 70 from the centrifuging zone 30. For example, if the ultrafiltration membrane does not require prefiltering of the feed, given the degree of separation accomplished in zone 30, and pasteurization is unnecessary or already accomplished, direct passage of the feed via lines 51 and 53 might be warranted.

Although the solubilized protein slurry produced in extraction zone 20 may be passed through various steps or zones such as 30, 40 and 50, it may be possible to pass a solubilized slurry directly to the ultrafiltration zone 70 via line 25 depending on process conditions, the nature of the ultimate products desired, and the nature of the ultrafiltration membrane system in ultrafiltration zone 70. However, in accordance with the present invention it is important that the makeup of the solubilized slurry passing from the solubilizing zone 10 to the ultrafiltration zone 70 be such as to produce the desired solubilized protein feed for a given ultrafiltration membrane system.

In accordance with the present invention ultrafiltration membranes with a molecular weight cutoff of about 70,000 and preferably of 100,000 daltons or more are needed to separate out of the soybean constituents which produce the tan to creamy color and which cause the beany flavor of the ultimate product. Additionally, and also in accordance with the present invention, the concentration or dilution of the solubilized protein slurry should be properly controlled. It is believed that proper concentration control limits self filtering which will otherwise occur on the ultrafiltration membranes.

Ultrafiltration is a technique for separating dissolved molecules on the basis of size by passing a solution through an infinitesimally fine filter. The ultrafilter comprises a tough, thin, selectively permeable membrane which retains molecules above a certain size, while allowing smaller molecules, including solvent, to pass into the filtrate. Thus, ultrafiltration provides a retained fraction or retentate which is enriched in large molecules, and a filtrate or permeate which contains few, if any, of these molecules.

Depending upon process conditions, any of a variety of configurations should be suitable for the ultrafiltration membrane, including tubular, hollow fiber, spiral wound, flat leaf or plate and frame systems. The membrane itself may be composed of any one of a number of materials. Either noncellulosic or cellulosic membranes may be used. However, noncellulosic membranes are preferred since they are operable over wider ranges of temperature and pH. For example, the membrane material might be polysulfone or polyvinyl chloride.

Effective use of ultrafiltration membranes has been limited due to several problems, including membrane fouling. Membrane fouling is generally manifested by a continuous decline in permeation flux that is believed to be substantially independent of feed-solute concentration. This fouling process is believed to be caused by membrane pore-plugging or the formation of a slowly consolidating, gelatinous solute layer on the upstream membrane surface. While in many cases these fouling contaminants can be removed from the membrane surface by appropriate cleaning and scouring procedures which may restore the original membrane permeability, membrane cleaning procedures cut into operating time, consume reagents, and in many cases, degrade membranes and other system components.

In accordance with the present invention it is believed that the proper control of the concentration and so viscosity of the feed to the ultrafiltration membrane properly controls membrane fouling and resultant self-filtering. A variety of devices and methods may be employed to accomplish this result. It is also believed that the need for cleaning and scouring procedures may be reduced, at least to the extent that it reduces the build up of a gel layer on the membrane surface.

In accordance with one aspect of the present invention the concentration, and so viscosity, of the solubilized protein feed may be properly controlled by means of a two phase filtration comprising a difiltration step followed by a concentration step. For example, as shon in FIG. 1 the ultrafiltration zone may comprise a supply zone or region such as holding or feed tank 72, an ultrafiltration membrane unit 74 and a permeate holding tank 77. Solubilized protein feed may be fed at a controlled rate from tank 72 to the ultrafiltration membrane system 74 via line 73. The permeate which passes through the ultrafiltration membrane passes via line 75 to permeate holding tank 77, while the retentate passes via line 76. All or a portion of the retentate may be recycled via line 78 to holding tank 72 or pass via lines 79 or 81.

In the first or difiltration phase solubilized protein feed passes via line 73 through ultrafiltration membrane system 74 at a controlled rate. A sufficient amount of water is added via line 71 to holding tank 72 to maintain the volume of solubilized protein solution contained in tank 72 at a substantially constant level. The amount of water passed via line 71 may be varied depending upon the amount of retentate recycled via line 78.

Figure 3:
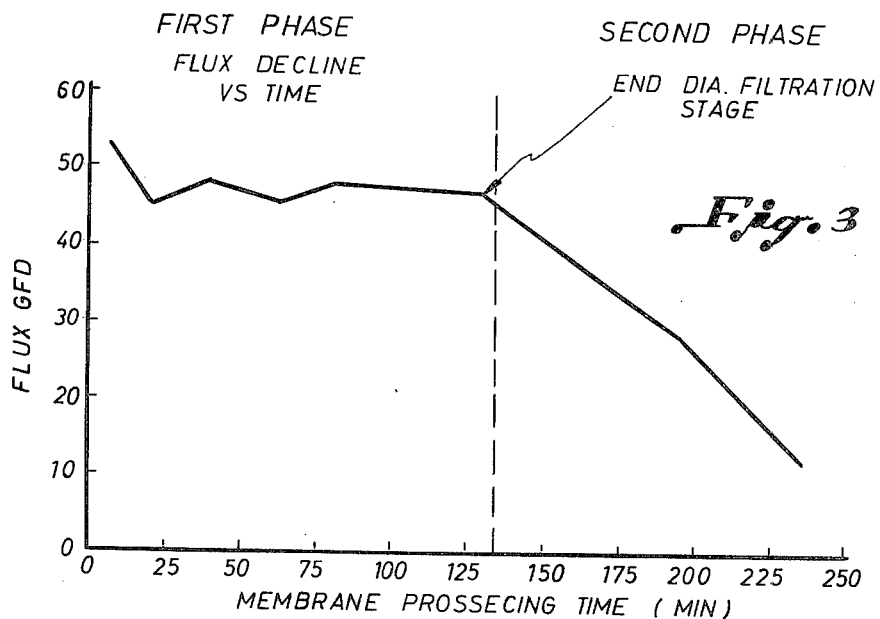
FIG. 3 is a graph depicting the flux rate across an ultrafiltration membrane in an embodiment of the present invention.

The solubilized feed is continually passed from holding tank 72 to ultrafiltration membrane system 74 and the volume of the solubilized feed in the holding tank 72 is preferably maintained at a substantially constant volume throughout the first phase of the difiltration step. During this time the flux of the permeate passing through the ultrafiltration membrane system 74 and hence via line 75 to holding tank 77 may vary slightly within a small range as indicated by FIG. 3. By way of example, the flux might vary from about 53 gallons per square foot per day (GFD) to approximately 45 GFD. The variation shown in FIG. 3 was apparently caused by fluctuations in temperature.

The first phase should continue until an amount of permeate equal to about 1.2 times or more and preferably 1.3 to 1.5 times the volume of the feed is collected as permeate. It is preferable if about 2.0 to 2.5 or 3.0 times the original volume of the feed is finally collected as permeate during the entire ultrafiltration processing sequence.

After a sufficient amount of time has passed the second or concentration phase begins. Although some separation continues, it is believed that the primary purpose serves by the concentration phase is the dewatering of the protein product. During the second phase the volume of the solubilized protein feed in tank 72 is allowed to decrease at a substantially steady rate until it occupies a predetermined percentage of its original volume. By way of example, the volume of the solubilized slurry in holding tank 72 may be allowed to drop to approximately 20% of its original volume. During the second phase the amount of permeate passing through the filtration membrane drops substantially. By way of example, the overall flux may drop by as much as 75%. This change in flux is further illustrated in FIG. 3.

As indicated in FIG. 1 the retentate ultimately obtained from the process may be passed via line 79 as a product in its liquid form or it may be passed via line 81 to be dried such as by spraying or freeze drying as appropriate in unit 80 and then passed via line 82 to storage. If a dewatered product is desired the pH is preferably adjusted to around 6.8 to 7.0 prior to spray drying.

If a liquid product is desired, it may be unnecessary to run all or a portion of the second or concentration phase. However, where the product is used in liquid form it may be desireable to adjust the pH. For example, if the liquid product is to be used to fortify a beverage, such as a cola-type juice, it might be desireable to reduce the pH of the product to about 4.5.

The permeate from the ultrafiltration system may be passed from tank 77 through a reverse osmosis membrane system indicated generally at 92. For example, the permeate from the ultrafiltration system may be passed through a reverse osmosis membrane system such as that manufactured by Western Dynetics, Inc. Such a system may include a membrane cast on the exterior of ceramic support cores. Although the type of membrane employed may vary, it is preferable that the membrane system be able to retain and remove the ultrafiltration permeate constituents from the reverse osmosis effluent.

The retentate from the reverse osmosis membrane operation indicated generally at 92 may be conveyed to a dryer 95 via line 94 for concentration as fertilizer or animal food ingredient or other by-product. In accordance with the present invention this by-product will have a higher protein content than prior processes using lower molecular weight cutoff ultrafiltration membranes.

The permeate from the reverse osmosis system 92 is essentially clarified water that may be recirculated via line 101 to line 14. Alternately, all or a portion of it may be passed back to line 71 for use in diluting the solubilized protein feed held in feed tank 72.

In accordance with the present invention it is essential to separate out a material portion of the color causing and taste causing soybean constituents. Thus, the nature of the feed solution and the type of membrane system employed should be set in conjunction with each other to achieve this objective. As already indicated, this may be accomplished by passing a dilute feed solution from a constant volume feed tank through the ultrafiltration membrane system. It is believed that due to the dilute nature of the feed solution the process limits the formation of a layer of self filtering material and hence facilitates the passage of the undesirable constituents through the ultrafiltration membrane as part of the permeate. It is also believed that the dilute nature of the feed solution prevents the smaller constituents from becoming intertwined with the larger constituents of the solution and hence further facilitates the removal of the undesirable constituents in the permeate. Thus, in accordance with the present invention the concentration of the feed solution may be varied somewhat depending upon the exact nature and number of the ultrafiltration membranes employed and the specific characteristics of the feed.

Other variations may be made in the process flow scheme. For example, it is believed that continuous operation might be attained by using a number of ultrafiltration membrane systems set up in series. Sufficient water could be added to the retentate of the preceding ultrafiltration membrane to sufficiently dilute it as a proper feed for each subsequent ultrafiltration membrane.

Figure 2:
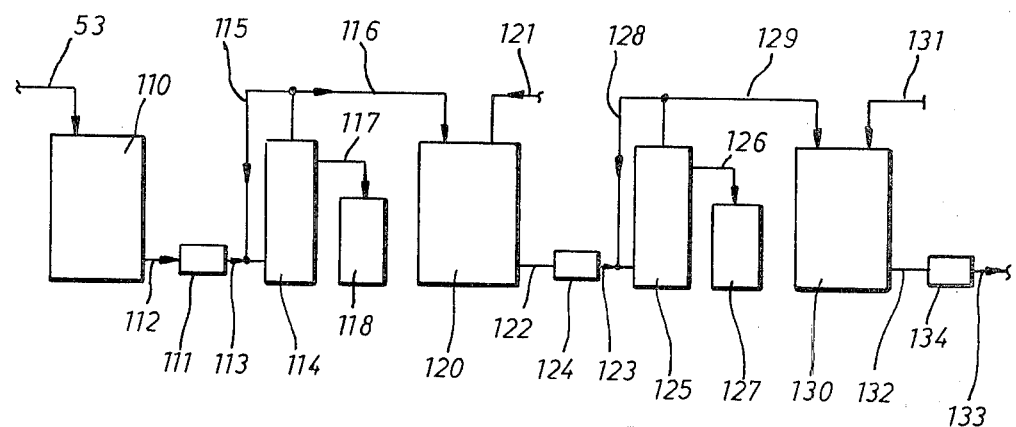
FIG. 2 is a flow diagram of another embodiment of the present invention.

An example of a serial membrane system is shown in FIG. 2. A solubilized protein feed, as already described in conjunction with FIG. 1, could be fed to a first ultrafiltration feed tank 110 via line 53. The feed could then be fed by pump 111 via lines 112 and 113 to ultrafiltration unit 114. A portion of the resulting retentate could then be recycled via lines 115 and 113, while the remainder of the retentate is passed to the next stage via line 116. The permeate from ultrafiltration unit 114 would pass via line 117 to permeate holding tank 118.

The first stage retentate in line 116 would serve as feed for tank 120 along with line 121 which would provide a diluting flow of solvent such as water. The flow rate of the water through line 121 is such as to approximate or equal the flow rate of permeate passing through line 117. As with the feed to ultrafiltration unit 114, the feed to ultrafiltration unit 125 is passed by pump 124 via lines 122 and 123. The second stage permeate is collected in permeate storage tank 127 from line 126, while the second stage retentate passes as a product, as recycle via line 128 or as feed via line 129 for a subsequent stage indicated by tank 130, water feed line 131, lines 132 and 133 and pump 134.

Many variations in the embodiment shown in FIG. 2 are possible. For example, tanks such as 110, 120 and 130 could be eliminated and sufficient amounts of water added to subsequent ultrafiltration unit feed lines such as 112, 122 and 132 by appropriate solvent feeder lines. Additionally, if a series of ultrafiltration membranes are employed, the nature of the membranes may vary. For example, the area of the downstream ultrafiltration membranes may be larger in order to maintain an appropriate flux if the viscosity of the retentate feed stream is increased. However, in accordance with the present invention it is particularly important that the molecular weight cutoff of the ultrafiltration membranes employed be about 70,000 and preferably 100,000 daltons or higher.

Depending upon the roduct desired, it may be preferable to employ a dispersed protein slurry, which may be passed directly to ultrafiltration zone 70 via line 25. For example, if a protein concentrate which is defined as a protein product having at least 70% by weight protein, is desired, it may be preferable to pass all or a portion of a dispersed protein slurry via line 25. However, if a protein isolate, which is defined as a product having at least 90% by weight protein, it may be preferable to pass all or substantially all of a solubilized protein slurry via line 21 as described above.

A dispersed protein slurry may be processed in almost the same fashion as a solubilized protein slurry. However, the pH of the initial mixture of protein containing material and water is either left unadjusted or lowered so that the value of the pH is between about 4.0 and 7.0 and preferably 4.5 and 6.7. For example, when producing a protein concentrate a dispersed protein slurry may be produced by adjusting the pH of the initial flour-water mixture in extraction zone 20 to 4.5 by using a suitable amount of a suitable acid, such as hydrochloric acid, to maximize the concentration of undissolved solids before passing the slurry directly via line 25 to untrafiltration zone 70. Alternately, the dispersed protein slurry formed within the extraction zone 20 may be formed by the addition of protein containing material to water and after a suitable extraction time passed via line 25 to ultrafiltration zone 70 without pH adjustment.

Referring again to FIG. 1, a soy protein concentrate may be produced by first mixing defatted soy flour or flakes in water in extraction zone 20 to produce a mixture wherein the ratio of soy to water by weight is between 60 to 1 and 10 to 1 and preferably 40 to 1 and the temperature of the mixture is between 40° and 70° C. A suitable acid, such as hydrochloric acid could be passed via line 11, thus setting the pH of the mixture between 4.0 and 7.0 and preferably at 4.5 to 6.7 in order to dissolve nonprotein soy constituents and partially dissolve at least some minor portion of the soy protein to produce a dispersed protein slurry. The dispersed protein slurry could then be forwarded via line 25 to supply zone or region 72 and then passed over the ultrafiltration membranes in ultrafiltration unit 74 in two phases essentially as heretofore described. Thus, the dispersed protein slurry could be passed through ultrafiltration unit 74 having at least one ultrafiltration membrane with a molecular weight cutoff of at least 70,000 to 80,000 and preferably 100,000 daltons or higher to produce a permeate and retentate while the original volume of the slurry is maintained in a supply zone such as feed tank 72. The constant volume may be maintained by adding water to make up for the permeate removed from the ultrafiltration membrane and any retentate not recycled to the feed tanks via line 78.

The retentate, which is recovered in either lines 79 or 82 is almost colorless when dried and has a substantially bland flavor.

In accordance with one aspect of the present invention it is generally believed to be unnecessary to prefilter the dispersed protein slurry prior to its passage over the ultafiltration membranes. However, prefiltering or other pre-ultrafiltration steps may be conducted as in the case with the solubilized protein slurry. Whether or not the filterable feed comprises a solubilized protein slurry or a dispersed protein slurry, the protein content of the final product may be controlled to a certain degree by varying certain process variables, such as initial pH level in extraction zone 20. Additionally, products produced by the ultrafiltration of the solubilized protein slurry and the dispersed protein slurry could be mixed to provide a wide variation in protein content, though the production of two separate products would be less effective, particularly since it would require two ultrafiltration membranes or separate operation of the same system.

Figure 4:
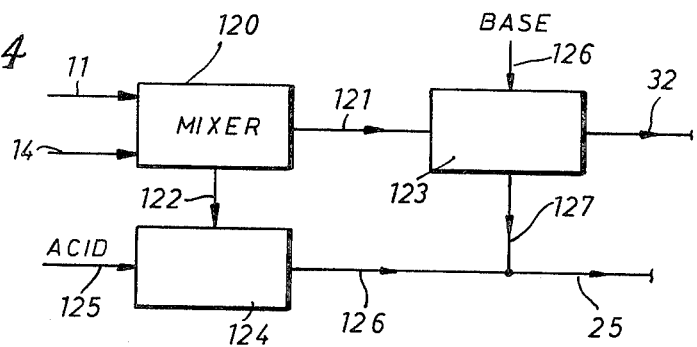
FIG. 4 is a partial flow diagram of another embodiment of the present invention.

It is believed that flexibility in producing a product with a specified protein content may be further enhanced by providing multiple feed streams to the ultrafiltration zone 70. For example, a solubilized protein stream and a dispersed protein stream may be fed in a predetermined ratio to a supply region such as feed tank 72 to produce a protein product with a preselected percentage of protein. Referring now to FIG. 4, a defatted soy flour passing via line 11 and water passing via line 14 could be mixed in mixer 120. Suitable portions of the mixture could then be passed via lines 121 and 122, respectively. Alternately, water and defatted soy flour could be added directly to solubilizing zone 123 along with a suitable amount of a base from line 126. In either event conditions in zone 123 should be such as to produce a solubilized protein feed as previously described.

The mixture passing via line 122 is mixed in unit 124 with an appropriate amount of a suitable acid from line 125 to produce a dispersed protein slurry as previously described. The dispersed protein slurry passes via line 126 for subsequent mixing with the solubilized protein feed passing from solubilizing zone 123 via line 127.

The combined streams pass via line 25 to ultrafiltration zone 70 to be processed as described above. By controlling the ratio of solubilized protein feed to dispersed protein slurry the percentage of protein in the ultimate product may be varied. For example, the ratio of solubilized protein feed to dispersed protein slurry might be set so as to produce a protein product having a protein content of approximately 80%.

The invention will now be more fully described in terms of the following examples. These examples are provided by way of further elaboration and description and not by way of limitation.

EXAMPLE 1

A soy isolate was prepared in accordance with the present invention as follows: 30 lbs of ADM Nutrisoy 7-B soy flakes were mixed in a tank with 900 lbs of water. A sufficient amount of sodium hydroxide was added to raise the pH to 8 and the temperature of the mixture was maintained at a temperature of 55° C. The mixture was left in the tank for about 40 to 45 minutes and was then subjected to 2 phase centrifuging. Approximately 62.86% by weight of the soy flakes were solubilized.

After the isolubles were separated by centrifugation the solubilized feed was pasteurized at a temperature of about 65° C. for 30 minutes and then prefiltered in a filter having a 20 micron pore size. A portion of the solubilized feed was then passed to a feed tank where it occupied an original volume of 80 gallons. The temperature of the solubilized feed entering the feed tank was 65° C.

The eighty gallons of solubilized feed were then pumped at a rate of 17 gallons per minute through an ultrafiltration unit having a molecular weight cutoff of 100,000 daltons and an area of 26.5 square feet. The ultrafiltration retentate was recycled to the feed tank while the permeate was collected in a permeate holding tank. During a two hour diafiltration or constant volume phase the temperature of the solubilized feed in the feed tank varied from approximately 61° to 69° C. and the flux of the permeate varied from approximately 53 GFD to about 45 GFD with a mean of approximately 38 GFD as shown in FIG. 3. During the two hour first phase approximately 1.375 times the original feed volume or 110 gallons was collected as ultrafiltration permeate. The total solids in the fee tank changed from approximately 2.1% at the start of the constant volume stage to about 1.64% at the end of the constant volume phase.

Once approximately 1.375 times the original feed volume or 110 gallons of ultrafiltration permeate was collected in the permeate holding tank, the concentration of the feed in the feed tank was allowed to increase for a period of approximately two hours, at the end of which time approximately 2 times the permeate or 160 gallons had been collected since the beginning of the ultrafiltration step. During the second phase while the concentration increased the temperature in the feed tank also dropped from approximately 56° C. to about 53° C. and the flux of the permeate changed from approximately 46 GFD to about 12.5 GFD. FIG. 3 provides a graphic illustration of this change in flux over time.

The retentate contained about 63.25% of the solubilized soy flasks, which was about 39.75% of the solids content of the original soy flakes. The retentate was subsequently spray dried and the dry protein product was found to be essentially tasteless and white to light cream in color. An analysis of the protein isolate product is set forth in Tables 2, 3, 4 and 5.

EXAMPLE 2

The process of Example 1 was repeated with toasted Staley I-200 soy flour as the starting material. Process conditions were approximately the same.

An analysis of the protein isolate product is set forth in Tables 2 and 3.

EXAMPLE 3

The process of Example 1 was repeated using the same materials under approximately the same process conditions. A comparison of some of the variables and results of this example is set forth in Tables 2, 3 and 5.

EXAMPLE 4

Staley I-200 toasted soy flour was treated by the process designated AP-2 and generally described in Lawhon et al, Alternate Processes for Use in Soy Protein Isolation by Industrial Ultrafiltration Membrane, 44 Journal of Food Science 213 (1979), hereby incorporated by reference. The flour was extracted using a 30 to 1 by weight water-to-four ratio. The solubilized protein slurry was then passed to an ultrafiltration membrane system with a molecular weight cutoff of 18,000 daltons. The feed was at a temperature of 65° C. A dilution techniques was used whereby the feed to the membrane was concentrated to about 25% of the original volume, then diluted back to its original volume and subsequently reconcentrated prior to passage to a spray dryer at neutral pH.

EXAMPLE 5

A soy protein concentrate was prepared in accordance with the present invention as follows. 6.25 lbs f SoyaFluff 200 W soy flour manufactured by Central Soya Company were mixed in a tank with 250 lbs. of water. The mixture was left in the tank for about 30 minutes at a temperature of 55° C. and was then pumped at a rate of 15 gallons per minute through an ultrafiltration unit having a molecular weight cutoff of 100,000 daltons and an area of 26.5 square feet. The pH of the mixture was 6.66. The ultrafiltration retentate was recycled to the feed tank while the permeate was collected in a permeate holding tank. During a constant volume phase the temperature of the mixture in the feed tank varied from approximately 58° to 64° C. and the flux of the permeate varied from approximately 48.8 to 61.7 GFD. During the constant volume phase approximately 1.2 times the original feed volume or 36 gallons was collected as ultrafiltration permeate.

Once approximately 1.2 times the original feed volume or 36 gallons of ultrafiltration permeate was collected in the permeate holding tank, the concentration of the feed in the feed tank was allowed to increase until approximately 2 times the original feed volume or 60 gallons had been collected as permeate since the beginning of the ultrafiltration step. During the second phase, while the concentration increased, the flux of the permeate also changed from 61.7 to 27.0 GFD.

The retentate contained about 73.7% of the soy solids originally in the feed mixture and about 95.8% of the soy nitrogen originally in the feed mixture. The retentate was subsequently freeze dried and the dry protein product was found to be essentially tasteless and white to light cream in color. An analysis of the protein concentrate product is set forth in Tables 6, 7 and 8.

Data was also taken on two commercial soy isolates labelled Commercial Isolates 1 and 2. Commercial isolate 1 was Pro Fam 90/HS soy isolate produced by Grain Processing of Muscatine, Iowa, while commercial isolate 2 was Promine D soy isolate produced by the Chemurgy Division of Central Soya Co. of Chicago, Ill.

Additionally, amono acid analysis of an acid "Precipitated Soy Curd" and a "Soy isolate" were obtained as set forth in Table 4. The "Soy isolate" was produced by extraction and ultrafiltration in an ultrafiltration membrane with a molecular weight cutoff under 20,000 daltons. The "Precipitated Soy Curd" was obtained by an acid precipitation method. These are compared to results from Example 1 reported herein.

Finally, data was obtained for a commercial soy concentrate as set forth in Tables 6 and 7. The commercial concentrate was Promosoy-100 soy concentrate produced by the Chemurgy Division of Central Soya Co. of Chicago, Ill.

TABLE 2

| Product from Example | Starting Material | Moist | Nitrogen[1] Total | Nitrogen[1] NPN | Protein[1] (N × 6.25) | Ash[1] | Total[1] Sugars | Urease Activity | Trypsin[2] Inhibitor | Color[3] Dry | Color[3] Wet |
|---|---|---|---|---|---|---|---|---|---|---|---|
| 1 | Untoasted ADM Nutrisoy 7-B Soy Flakes | 5.3 | 15.15 | 0.14 | 94.67 | 3.86 | 6.53 | 1.86 | 56.7 | 85.9 | 64.7 |
| 2 | Toasted Staley I-200 Soy Flour | 7.0 | 15.00 | 0.32 | 93.77 | 5.30 | 7.50 | 1.01 | 30.8 | 85.6 | 58.7 |
| 4 | | 7.8 | 14.82 | 0.33 | 92.63 | 6.7 | 6.6 | 0.03 | 10.3 | 82.4 | 61.6 |
| Commercial Isolate 1 | | 3.9 | 14.7 | 0.21 | 91.84 | 4.0 | 4.1 | — | — | 82.5 | 66.3 |
| Commercial Isolate 2 | | 6.3 | 15.41 | 0.17 | 96.3 | 3.8 | 3.1 | 0.02 | 29.8 | 80.5 | 63.7 |

[1]On a percentage dry weight basis
[2]TIU/mg
[3]Color measurements were obtained using a Gardner Color Difference Meter utilizing a scale of 0 (black) to 100 (white).

TABLE 3

Nitrogen Solubility Profiles

| Product from Example No. | pH of Measurement | | | | | | | | |
|---|---|---|---|---|---|---|---|---|---|
| | 2.0 | 2.5 | 3.0 | 3.5 | 4.0 | 5.5 | 6.0 | 7.0 | 9.0 |
| 1 | 98.0 | 100.0 | 100.0 | 95.5 | 12.9 | 9.3 | 81.8 | 99.1 | 100.0 |
| 2 | 81.9 | 92.7 | 97.8 | 69.7 | 9.3 | 8.7 | 87.6 | 100.0 | 100.0 |
| 4 | 94.8 | 96.1 | 66.0 | 9.7 | 4.8 | 7.8 | 83.3 | 98.4 | 98.7 |
| Commercial Isolate 1 | 66.2 | 59.8 | 47.0 | 38.3 | 6.6 | 26.5 | 45.1 | 66.1 | 69.7 |

TABLE 4

Amino Acid Analysis of Soy Isolate Products
Basis: g/16gN

| Amino Acids | Soy isolate | Precipitated soy curd | Example 1 |
|---|---|---|---|
| Lysine | 6.1 | 6.0 | 6.1 |
| Histidine | 2.4 | 2.5 | 2.4 |
| Ammonia | 2.1 | 2.1 | 2.2 |
| Arginine | 7.4 | 7.4 | 7.5 |
| Tryptophan | 1.6 | 1.6 | 1.0 |
| Cystine[a] | 1.9 | 1.7 | 1.8 |
| Aspartic acid | 11.8 | 11.6 | 12.2 |
| Threonine | 3.4 | 3.3 | 3.4 |
| Serine | 5.0 | 4.9 | 5.2 |
| Gluramic acid | 20.7 | 20.3 | 20.8 |
| Proline | 4.8 | 4.8 | 5.1 |
| Glycine | 4.0 | 3.9 | 4.0 |
| Alanine | 3.7 | 3.7 | 3.7 |
| Valine | 4.4 | 4.5 | 4.2 |
| Methionine | 1.3 | 1.2 | 1.3 |
| Isoleucine | 4.4 | 4.5 | 4.7 |
| Leucine | 7.3 | 6.4 | 7.7 |
| Tyrosine | 3.6 | 3.6 | 3.6 |
| Phenylalanine | 5.0 | 5.1 | 5.2 |
| Totals | 100.9 | 100.3 | 102.1 |
| Available Lysine | 5.5 | 5.6 | 5.9 |

TABLE 5

Summary of Membrane Performance and Yield Data for Examples 1 and 3

| | Example 1 | Example 3 | Mean |
|---|---|---|---|
| Solids extracted from flakes, % | 62.9 | 67.2 | 65.0 |
| Extracted solids retained by membrane, % | 63.3 | 59.1 | 61.2 |

TABLE 5-continued

Summary of Membrane Performance and Yield Data for Examples 1 and 3

|  | Example 1 | Example 3 | Mean |
|---|---|---|---|
| Flakes solids retained by membrane, % | 39.8 | 39.7 | 39.75 |
| Nitrogen extracted from flakes, % | 71.7 | 71.2 | 71.5 |
| Extracted Nitrogen retained by membrane, % | 96.1 | 97.4 | 96.8 |
| Nitrogen originally in flakes and retained by membrane, % | 69.0 | 69.9 | 69.5 |
| Mean Permeation Rates, GFD. | 38.0 | 38.4 | 38.2 |
| Feed Constituents retained by Membrane | | | |
| Total Solids, % | 81.8 | 77.3 | 79.6 |
| Ash, % | 57.2 | 37.1 | 48.4 |
| Total Sugars, % | 29.4 | 24.6 | 27.0 |
| Nitrogen, % | 95.8 | 96.3 | 96.1 |
| Nonprotein nitrogen, % | 51.5 | 30.1 | 41.7 |

TABLE 6

Analytical Data on Soy Protein Concentrate from the Present Invention and a Commercial Soy Protein Concentrate

|  | Starting Material | Moist | Nitrogen[1] Total | Nitrogen[1] NPN | Protein[1] (N × 6.25) | Ash[1] | Total[1] Sugars | Color[2] Dry | Color[2] Wet |
|---|---|---|---|---|---|---|---|---|---|
| Product from Example 5 | SOYAFLUFF 200 W Soy Flour | 2.93 | 11.34 | 0.122 | 70.87 | 3.09 | 2.31 | 88.4 | 64.8 |
| Commercial Soy Concentrate | | 7.38 | 11.35 | 0.176 | 70.89 | 6.77 | 2.86 | 87.4 | 71.9 |

[1] On a percentage dry weight basis.
[2] Color measurements were obtained using a Gardner Color Difference Meter utilizing a scale of 0 (black) to 100 (white).

TABLE 7

Nitrogen Solubility Profiles on Soy Protein Concentrate from the Present Invention and on a Commercial Soy Protein Concentrate

| pH of Measurement | 2.0 | 2.5 | 3.0 | 3.5 | 4.0 | 5.5 | 6.0 | 7.0 | 9.0 |
|---|---|---|---|---|---|---|---|---|---|
| Product from Example 5 | 76.2 | 69.6 | 61.4 | 52.1 | 20.8 | 6.0 | 36.6 | 62.0 | 70.1 |
| Commercial Soy Protein Concentrate | 10.6 | 7.0 | 3.5 | 2.8 | 2.1 | 3.5 | 4.0 | 6.7 | 12.4 |

TABLE 8

Summary of Membrane Performance for Example 5

| Mean Permeation Rate, GFD | 52.8 |
|---|---|
| Feed Constituents Retained by Membrane: | |
| Total Solids, % | 73.7 |
| Ash, % | 36.3 |
| Total Sugars, % | 44.0 |
| Nitrogen, % | 95.8 |
| Nonprotein nitrogen, % | 15.6 |

As the foregoing examples indicate, a process according to the present invention produces a blander, generally less colorful product for a given starting material, while still retaining many if not all of the favorable characteristics of prior products. These characteristics include generally increased protein content with similar or reduced amounts of ash as indicated by the data set forth in Table 1; similar or greater nitrogen solubility for a given pH as shown in Table 3, and similar or somewhat improved amino acid analysis as set forth in Table 4. The data set forth in Table 5 indicates the generally repeatable nature of the process and further illustrates the process and nature of the protein product obtained in accordance with the present invention.

As indicated in Tables 2 and 6 the color of a soy protein produced in accordance with the present invention is lighter for a given starting material than prior soy protein products. The color of the dry protein product produced in accordance with the present invention is whiter than prior soy protein products. The color of the soy protein also compares favorably when wet. Color is a function of the pH of extraction, the type of base used in extraction and the starting material. For example, when a soy isolate is produced a toasted flour will generally produce a more tan product than an untoasted flour as will an increase in pH or the use of sodium rather than calcium hydroxide in the extraction step. It is believed that this accounts for the somewhat lighter color of the wet product obtained from one of the commercial soy isolates when measured wet.

Additionally based on preliminary tests, it is believed that solutions of the dry product isolates produced in accordance with the present invention tend to be less cloudy and more translucent than prior products.

Thus, the protein product of the present invention compares quite favorably with other protein products. Yet the flavor of the soy protein product is distinctively more bland than prior protein products produced. Additionally, its functional characteristics in food products, such as cheese, are also improved. For example, use of a soy isolate produced in accordance with the present invention in a processed type cheese produced a product with good mouthfeel, texture and flavor characteristics.

It is expected that protein concentrates produced by this invention will be suitable for use in a broader range of food applications due to increased protein functionality thereof. It is believed that a protein concentrate produced in accordance with the present invention will retain some of the more soluble and more nutritious low molecular proteins conventionally removed by commercial processes during extraction of soluble sugars, salts, and minor constituents. For example, in the case of the protein concentrate product produced in Example 5, in addition to being distinctively more bland and lighter in color than conventionally-produced protein concentrates, the product of Example 5 was higher in nitrogen solubility, comparing favorably with the nitrogen solubility of some commercial soy isolates (see Tables 3 and 7).

As a general rule it appears that a somewhat smaller amount of the protein enters the final product than would be the case if a lower molecular weight cutoff ultrafiltration membrane were employed. However, this is felt to be more than offset by the improved characteristics of the protein isolate and the increase in protein content of the by-product from the permeate, as is the case when reverse osmosis is employed. The amount of protein recovered is also higher than that of more conventional acid precipitation processes, which usually recover about 34% of the weight of the flour as soy isolate.

The amount of protein recovered is also higher than would otherwise be expected in view of the size of the pore membranes. The use of higher cutoff molecular weight membranes in producing protein products has been limited at least in part due to the low molecular weights of certain protein fractions. For example, as indicated in Table 1 more than approximately one-fourth of the protein contained in soybean has a molecular weight of 61,700 or less. Thus, it was heretofore believed that the use of a higher molecular weight cutoff such as 70,000 to 100,00 daltons or higher would result in a loss of at least 22% or more of the protein. Yet the portion going into the final product was reduced from about 45% of the weight of soy flour or flakes extracted when using prior art ultrafiltration processes to about 40% of the weight of soy flour or flakes extracted when using the present invention. This amounts to a reduction of about 1/9 or 11% as compared to the better than 22% expected.

The percentage of protein in the product may vary. For example, the product produced by a process in accordance with this invention might preferably be a soy isolate—i.e. a product with a protein content of at least 90% by weight—or a soy concentrate—i.e. a product with a protein content of at least 70% by weight. Additionally, the protein content may be varied by use of multiple streams as previously indicated.

As evidenced by the successful processing of the slurry in Example 5, it is believed that a feed containing undissolved solids may be ultrafiltered in accordance with the present invention, particularly where a dispersed protein slurry is passed directly to the ultrafiltration zone 70.

It is also noted that the slurry of Example 5 was not only successfully ultrafiltered, but ultrafiltered at an unexpectedly higher mean permeation rate than had been achieved previously when processing prefiltered solutions with the same ultrafiltration unit. As shown in Table 8, and mean permeation rate of 52.8 GFD was achieved when ultrafiltration processing the soy flour-water slurry of Example 5. The mean permeation rates achieved when processing a prefiltered soy protein solution, as shown in Table 5, was 38.2 GFD. It is theorized that the presence of undissolved solids in the feed to the membrane, at the high concentration existing in the soy flour-water slurry, may have unexpectedly imposed a scouring effect on the membrane surface as the feed stream flowed past, which sufficiently reduced self filtering tendencies to allow an increased flow rate, yet still permitted material removal of the undesireable compounds.

Although the foregoing discussion and description is limited to soy based proteins, it is to be understood that peanut based proteins are also encompassed within the spirit and framework of the present invention. Thus, defatted peanut flour may be processed under substantially the same conditions as set forth for soy flour above to produce a substantially bland and colorless protein product. Similarly, it is believed that undefatted peanut flour may also be processed under substantially the same conditions.

It is also believed that the process of the present invention may be applied to any nonbinding oilseed wherein substantially all the color causing and flavor causing constituents do not form an integral part of and are not bound to the protein in the oilseed. For example, it is believed that sesame seeds and glandless cotton seed would fall into the category of nonbinding oilseeds along with soybeans and peanuts. Consequently, the references to nonbinding oilseeds in the claims are to be understood as applying to soybeans, peanuts and the like.

It will be apparent to those skilled in the art having the benefit of this disclosure that various modifications may be made to the disclosed method without deviating from the overall inventive concept. For example, as set forth above a continuous, multi-stage ultrafiltration system may be used as an alternative to a batch operation process. Additionally, a number of the preultrafiltration steps may be deleted or modified or any of a variety of solubilizing or dispersion techniques may be employed. Furthermore, any liquid separated from the retentate product in unit, 80 could be combined with permeate passing from the ultrafiltration system via line 75.

Further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention shown and described are to be taken as the presently preferred embodiments. Various changes may be made in the arrangement of the steps or materials used. For example, equivalent materials may be substituted for those illustrated and described herein, and certain features of the invention may be utilized independently of the use of other features. All this would be apparent to one skilled in the art after having the benefit of this description of the invention.

What is claimed is:

1. A method of processing nonbinding oilseeds comprising the steps of:
   solubilizing at least a portion of the protein contained in the oilseed to produce a filterable protein feed stream; and
   passing the protein feed stream through an ultrafiltration membrane system with a molecular weight cutoff of about 70,000 daltons to separate out proteins, while controlling the concentration of the feed to limit self filtering and produce a permeate and a retentate, the retentate having a substantially bland taste and colorless appearance when dried.

2. A method according to claim 1 where in the molecular weight cutoff of the ultrafiltration membrane system is at least about 100,000 daltons.

3. A method according to claims 1 or 2 wherein the filterable protein feed stream is produced by extracting oilseeds in an alkaline environment to produce a solubilized protein solution.

4. A method according to claims 1 or 2 wherein the filterable protein feed stream is produced by extracting oilseeds in an acidic environment to produce a dispersed protein slurry.

5. A process according to claims 1 or 2 wherein the oilseed is soybean and the soybean in the feed is initially in the form of defatted soybean.

6. The protein product produced from oilseeds by the process of claims 1 or 2.

7. The method of claims 1 or 2 further comprising the step of passing the permeate through a reverse osmosis membrane.

8. A process according to claim 7 wherein the permeate of the reverse osmosis membrane is essentially water.

9. A process according to claim 8 wherein the permeate of the reverse osmosis membrane is recirculated for solubilizing a portion of the oilseed.

10. A process according to claim 7 wherein at least a portion of the reverse osmosis membrane permeate is used to control the concentration of the feed stream prior to its passage through the ultrafiltration membrane system.

11. A method of processing nonbinding oilseed protein comprising the steps of:
   extracting oilseeds in an alkaline environment to produce a solubilized protein solution;
   removing at least a portion of any insoluble residue from the protein solution; and
   passing the protein solution over an ultrafiltration membrane with a molecular weight cutoff of at least about 100,000 to separate out color causing and taste causing components and to produce permeate and a retentate, the retentate having a substantially bland taste and a colorless appearance when dry.

12. A process according to claim 11 wherein the concentration of the solution is controlled to limit self-filtering in the ultrafiltration membrane.

13. A process according to claim 12 wherein the step of controlling the concentration of the solution to limit self-filtering is accomplished by adding water to a supply zone essentially upon the initiation of ultrafiltration to essentially maintain the original volume of the solution in the supply zone.

14. A method according to claim 11 further comprising the step of pasteurizing the solubilized protein solution prior to passing the protein solution through the ultrafiltration membrane.

15. A process according to claim 11 wherein the oilseed is soybean and the soybean extracted is initially in the form of defatted soybean.

16. A process according to claim 11 wherein the solubilized protein solution initially comprises oilseed, water, and sodium hydroxide.

17. A process according to claim 11 wherein the solubilized protein solution initially comprises oilseed, water, and calcium hydroxide.

18. A process according to claims 11, 16 or 17 wherein the oilseeds are extracted in an alkaline solution and ratio of water to oilseed in the alkaline solution is at least 10 to 1.

19. A process according to claim 11 wherein the protein solution is fed from a supply region and further comprising the steps of concurrently recycling the retentate and passing water to the supply region, the amount of water and retentate being sufficient to maintain the volume of the solubilized protein solution at a substantially constant volume.

20. A process according to claim 19 wherein the volume of the solubilized protein solution is maintained at a constant level until a volume of permeate collected is at least 1.2 times as large as the constant volume.

21. The process according to claim 20 wherein the volume of permeate ultimately collected is between approximately 2 and 3 times as large as the constant volume.

22. A process according to claim 11 wherein the retentate is passed through at least one more ultrafiltration membrane.

23. The protein product produced from oilseed by the process of claim 11.

24. The protein product of claim 23 wherein the protein product is an isolate.

25. The protein product of claim 23 having a Gardner color difference meter reading of at least 80 when the product is dry.

26. A method of processing nonbinding oilseed protein having a substantially bland taste and colorless appearance comprising the steps of:
   mixing oilseeds in water to produce a mixture;
   regulating the pH of the mixture while controlling the temperature and concentration of the oilseeds in the mixture in order to dissolve oilseed protein and and produce a solubilized protein slurry comprising a protein solution;
   separating out insolubilized solids from the protein slurry;
   prefiltering the protein slurry to remove a sufficient amount of suspended matter in preparation for the ultrafiltration of the protein solution; and
   passing the protein solution over at least one ultrafiltration membrane with a molecular weight cutoff of at least about 100,000 daltons to produce a permeate and a retentate while essentially maintaining the original volume of the protein solution in a supply zone as the solution is being ultrafiltered by adding water at a rate sufficient to compensate for the permeate being removed from the ultrafiltration membrane and any retentate not recycled to the supply zone.

27. A protein produced from oilseeds according to the process of claim 26.

28. A process according to claim 26 further comprising the step of passing the permeate from the ultrafiltration membrane through a reverse osmosis membrane to produce a reverse osmosis permeate and a reverse osmosis retentate, the reverse osmosis permeate consisting substantially of water.

29. A process according to claim 26 wherein the pH of the mixture is greater than 7.

30. A method of processing soy protein having a substantially bland taste and colorless appearance comprising the steps of:
   mixing defatted soy flour in water to produce a mixture wherein the ratio of soy to water by weight is between about 40 to 1 and about 10 to 1 and the temperature of the mixture is between about 50 and about 60° C.;

setting the pH of the mixture between about 7 and about 8 in order to dissolve soy protein and produce a solubilized protein slurry comprising a protein solution;

separating out insolubilized solids from the protein slurry;

prefiltering the protein slurry to remove a sufficient amount of suspended matter in preparation for the ultrafiltration of the protein solution;

passing the protein solution over at least one ultrafiltration membrane with a molecular weight cutoff of at least about 100,000 to produce a permeate and a retentate while substantially maintaining the original volume of the protein solution in a feed tank as the solution is being ultrafiltered by adding water to make up for permeate removed from the ultrafiltration membrane and any retentate not recycled to the feed tank while recycling at least a portion of the retentate to the feed tank and collecting the permeate;

allowing the volume of the protein solution in the feed tank to decrease once a volume of permeate equal to at least about 1.2 times the volume of the protein solution in the feed tank is collected; and thereafter mixing any unrecycled retentate with the protein solution.

31. The protein product produced by the performance of the process defined in claim 30.

32. A process according to claim 30 further comprising the steps of:

allowing the volume of the protein solution in the feed tank to decrease until a volume of permeate equal to at least about 2.0 times the volume of the protein solution in the feed tank is collected; and thereafter mixing any unrecycled retentate with the protein solution and spray drying the resultant mixture.

33. A method of producing nonbinding oilseed protein comprising the steps of:

extracting oilseeds in an acidic environment to produce a dispersed protein slurry; and passing the protein slurry over an ultrafiltration membrane with a molecular weight cutoff of at least about 100,000 to separate out color causing and taste causing components and to produce a permeate and a retentate, the retentate having a substantially bland taste and a colorless appearance when dry.

34. A process according to claim 33 wherein the concentration of the slurry is controlled to limit self-filtering in the ultrafiltration membrane.

35. A process according to claim 33 wherein the step of controlling the concentration of the slurry to limit self-filtering is accomplished by adding water to a supply zone essentially upon the initiation of ultrafiltration to essentially maintain the original volume of the slurry in the supply zone.

36. A process according to claim 33 wherein the pH of the dispersed protein slurry is at least 4.5.

37. The protein product produced from oilseeds by the process of claim 33.

38. A method of producing a soy protein concentrate having a substantially bland taste and colorless appearance comprising the steps of:

mixing defatted soy flour in water to produce a mixture wherein the ratio of soy to water by weight is between about 40 to 1 and about 10 to 1 and the temperature of the mixture is between about 50 and about 60° C.;

controlling the pH of the mixture to dissolve nonprotein constituents including sugars and salts and a portion of the protein and to produce a dispersed protein slurry comprising undissolved protein; and passing the protein slurry over at least one ultrafiltration membrane with a molecular weight cutoff of at least about 100,000 to produce a permeate and a retentate while substantially maintaining the original volume of the protein slurry in a feed tank as the slurry is being ultrafiltered by adding water to make up for permeate removed from the ultrafiltration membrane and any retentate not recycled to the feed tank while recycling at least a portion of the retentate to the feed tank and collecting the permeate.

39. A process according to claim 38 further comprising the steps of:

allowing the volume of the protein slurry in the feed tank to decrease once a volume of permeate equal to at least about 1.2 times the volume of the protein slurry in the feed tank is collected; and thereafter mixing any unrecycled retentate with the protein slurry.

40. A process according to claim 39 further comprising the steps of:

allowing the volume of the protein solution in the feed tank to decrease until a volume of permeate equal to at least about 2.0 times the volume of the protein solution in the feed tank is collected; and thereafter mixing any unrecycled retentate with the protein solution and spray drying the resultant mixture.

41. The process of claims 38 or 39 wherein the pH of the flour-water mixture is set at approximately 4.5.

42. The process of claims 38 or 39 wherein the pH of the flour-water mixture is controlled by the addition of a suitable acid.

43. The process of claim 42 wherein the acid is hydrochloric acid.

44. The protein product produced by the performance of the process defined in claim 38.

45. A method of processing nonbinding oilseeds comprising the steps of:

extracting a first portion of the oilseeds in an alkaline environment to produce a solubilized protein solution;

extracting a second portion of the oilseeds in an acidic environment to produce a dispersed protein slurry;

mixing the solubilized protein solution and dispersed protein slurry; and passing the mixture over an ultrafiltration membrane having a molecular weight cutoff of at least about 100,000 to separate out color causing and taste causing components and to produce a permeate and a retentate, the retentate having a substantially bland taste and a colorless appearance when dry.

46. A process according to claim 45 wherein the ratio of the amount of oilseeds in the first and second portions is set in order to control the percentage of protein in the retentate.

* * * * *